United States Patent [19]
Ouchi et al.

[11] Patent Number: 4,754,859
[45] Date of Patent: Jul. 5, 1988

[54] ONE-WAY CLUTCH AND APPLICATION THEREFOR

[75] Inventors: Yoshio Ouchi, Hamakita; Akifumi Oishi; Shigeo Hagiwara, both of Hamamatsu, all of Japan

[73] Assignee: Yamaha Hatsudoki Kabushiki Kaisha, Japan

[21] Appl. No.: 854,156

[22] Filed: Apr. 21, 1986

[51] Int. Cl.⁴ ............................................. F16D 41/07
[52] U.S. Cl. ..................................... 192/45; 192/45.1
[58] Field of Search ................................. 192/45, 45.1

[56] References Cited
FOREIGN PATENT DOCUMENTS

| 1025217 | 2/1958 | Fed. Rep. of Germany | 192/45 |
| 2134618 | 1/1973 | Fed. Rep. of Germany | 192/45 |
| 1026948 | 4/1966 | United Kingdom | 192/45 |

Primary Examiner—David A. Scherbel
Assistant Examiner—Richard E. Chilcot, Jr.
Attorney, Agent, or Firm—Ernest A. Beutler

[57] ABSTRACT

A number of embodiments of one-way clutches and applications therefor. In all embodiments, the one-way clutch is comprised of an outer member that is formed from a first portion that defines caging recesses for receiving the wedging members of the clutch and a second portion that forms the wedging surfaces with which the wedging members cooperate. the first portion is formed from a lighter weight, lower tensile strength material than the second portion so as to reduce the weight of the overall assembly without sacrificing strength. In the various embodiments, the outer member is reinforced by a number of different elements of the associated device such as a gear, pulley, oil filter or generator element. In some embodiments, one or both of the portions of the outer member are formed from a plurality of identically configured pieces so as to facilitate manufacturing. In several embodiiments, the wedging surfaces are formed by a continuous flange of the respective portion so as to provide additional reinforcing.

25 Claims, 12 Drawing Sheets

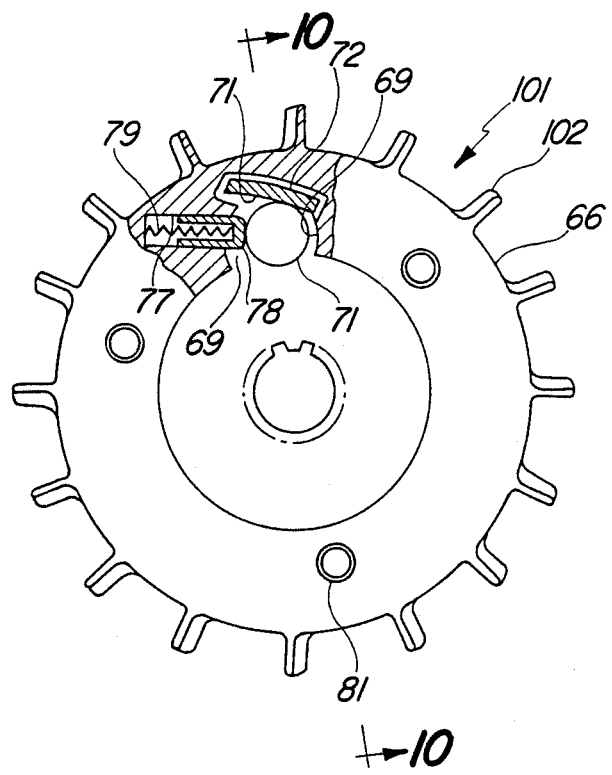
_Fig-9_
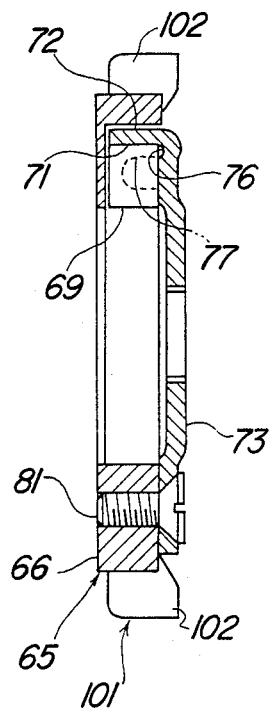
_Fig-10_

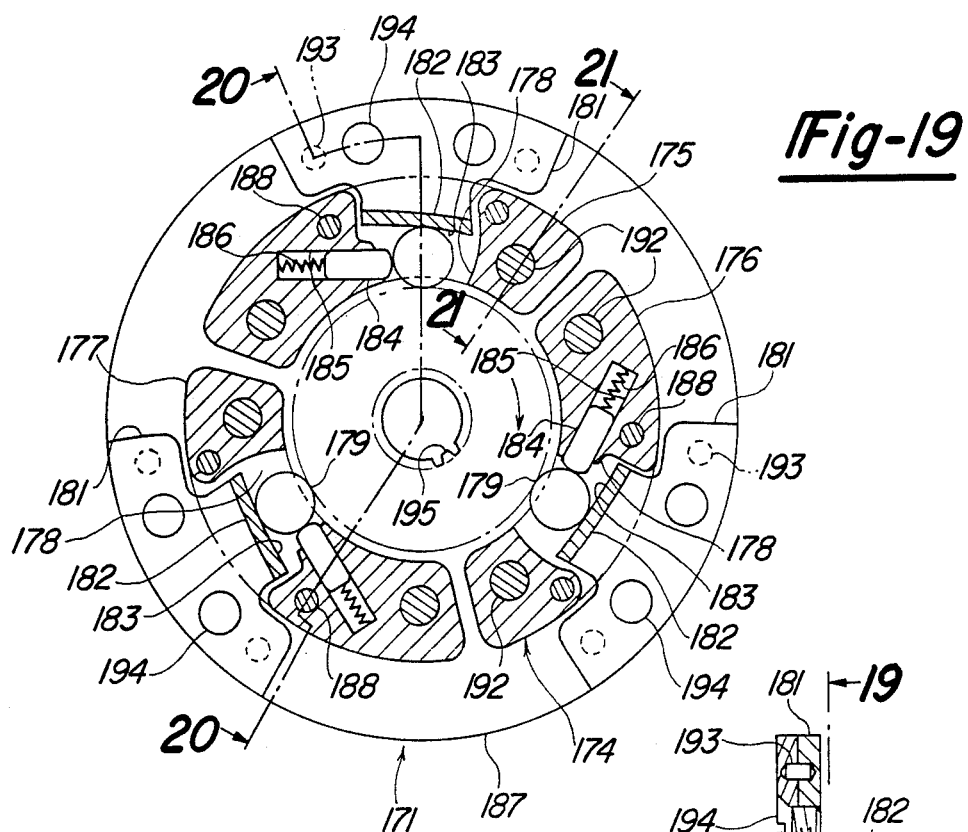
Fig-19
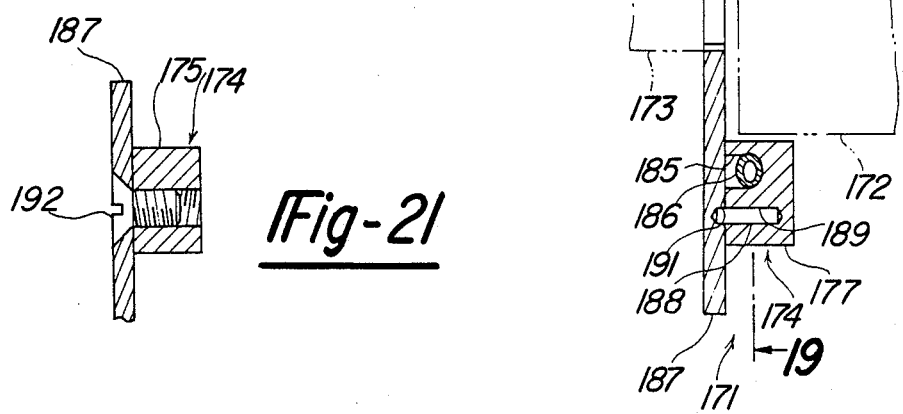
Fig-20
Fig-21

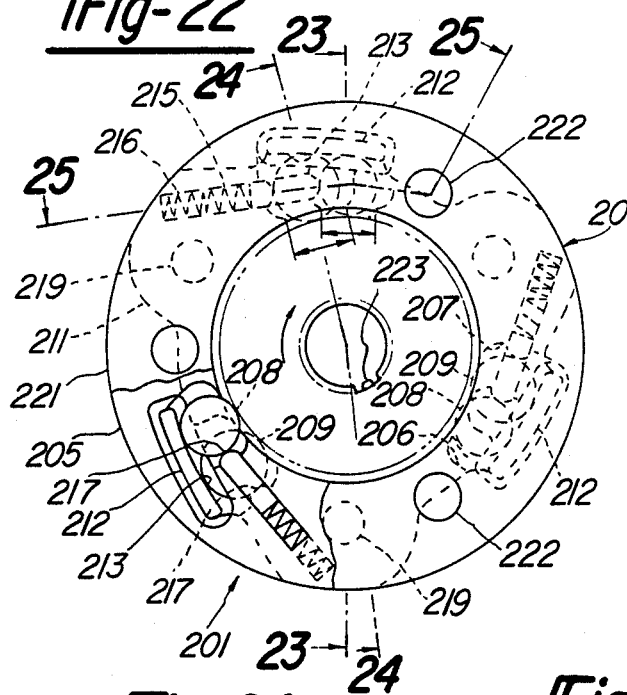
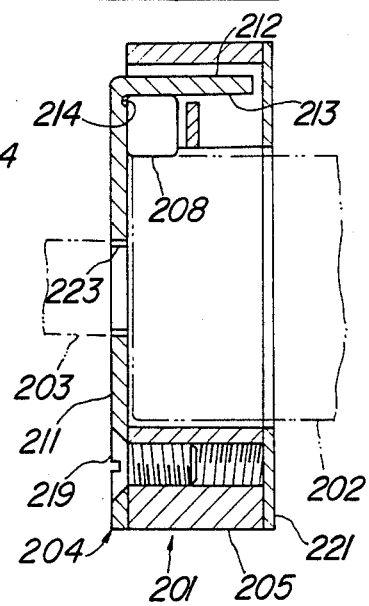
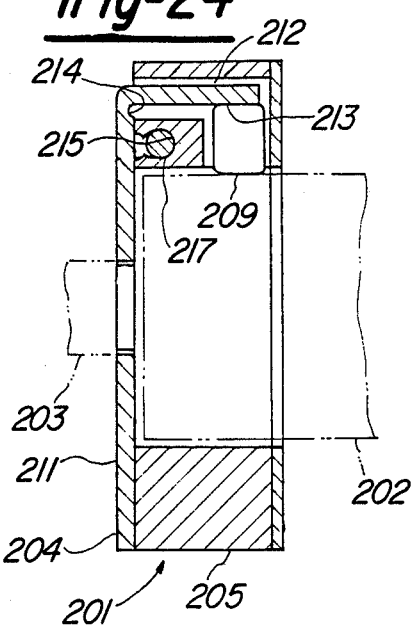
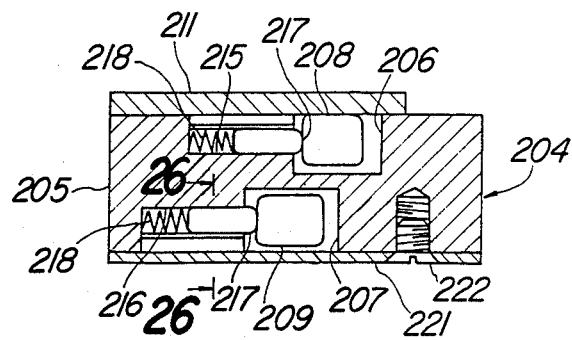
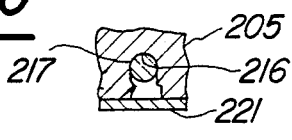

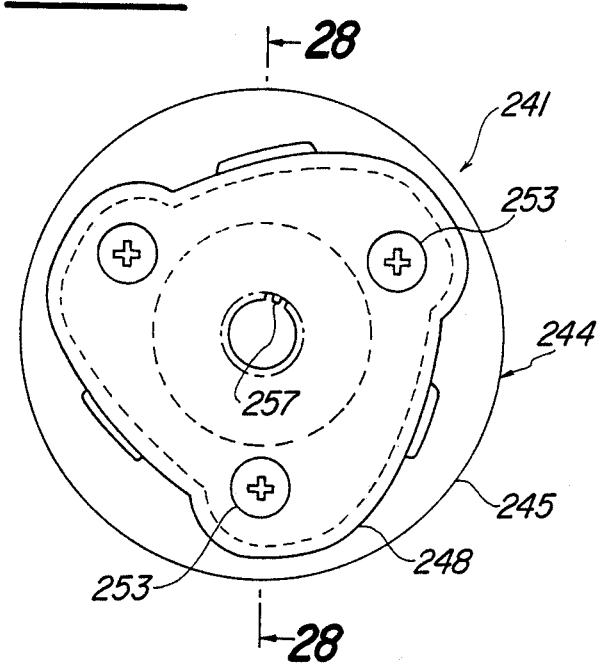
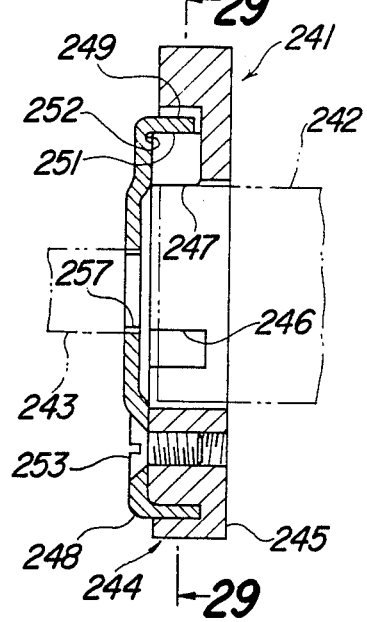
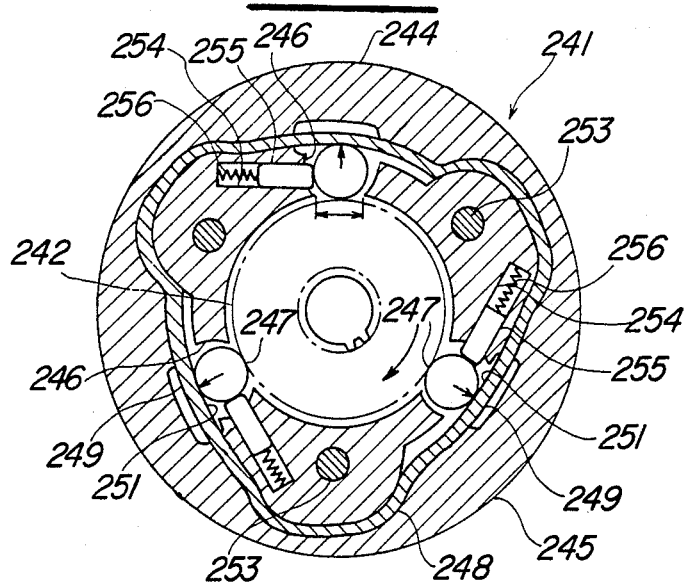
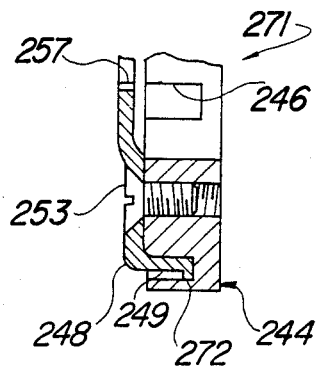

ONE-WAY CLUTCH AND APPLICATION THEREFOR

BACKGROUND OF THE INVENTION

This invention relates to an improved one-way clutch assembly and applications for such a clutch.

It is well known to employ one-way clutches for a wide variety of uses. Such clutches are operative to provide a driving relationship between a first member and a second member and yet permit the second member to overrun the first member under certain conditions. For example, such a one-way clutch may be utilized in conjunction with the starting mechanism of an internal combustion engine. The one-way clutch provides a driving connection between the starter motor and the engine output shaft for rotating the engine output shaft when the starter motor is operated to provide starting. However, once the engine starts and the starter motor is stopped, the one-way clutch permits the engine output shaft to be driven without driving the starting motor.

It should be seen, therefore, that relatively large power must be transmitted through the one-way clutch. Normally the one-way clutch includes an outer member in which recesses are formed that receive wedging members and which have wedging surfaces against which the wedging members react. An inner member is rotatable relative to the outer member and has its outer surface engaged by the wedging members so as to provide a driving relationship between them. However, the wedging members are permitted to move away from the wedging surface of the outer member to permit overrunning. It should be readily apparent that the outer member must be formed from a very strong material to resist the large tensile forces exerted upon its wedging surfaces. Because of this, one-way clutches of the type heretofore utilized have been quite heavy.

Recently, it has been proposed to form the outer member from a two-piece construction with one of these pieces being formed from a lighter weight, less strong material and which defines only the recesses in which the wedging members are received. A second, considerably stronger element, is fixed relative to the first member and has projections that extend into the recesses and which form the actual wedging surfaces. In this way, the weight can be reduced significantly without sacrificing the strength of the unit.

It is a first object of this invention to provide an improved one-way clutch of the aforenoted type wherein a further weight reduction is possible.

It is another object of this invention to provide an improved arrangement for reinforcing the member forming the wedging surfaces through its attachment to another related element so as to further reduce the overall weight of the one-way clutch.

It should be apparent from the foregoing description of the construction of a one-way clutch that it is a relatively complicated structure. The outer member must form recesses for receiving the wedging elements and also is required to form a reaction surface against which biasing means operate for biasing the wedging members into engagement with the related inner and outer member surfaces. As such, if the two elements of the outer member are formed as single pieces, the cost of manufacturing them can be quite significant.

It is, therefore, a further object of this invention to provide an improved and simplified construction for a one-way clutch.

It is another object of the invention to provide a one-way clutch arrangement that may be conveniently and inexpensively manufactured.

It should be apparent that the amount of power that may be transmitted through a one-way clutch is dependent upon the surface area of contact between the wedging members and the corresponding surfaces which they engage. In a given physical location, however, there is a practical limit to the amount of surface area which is possible.

It is, therefore, a further object of this invention to provide an improved one-way clutch that is compact and which is capable of transmitting larger amounts of power than prior art type of devices.

In one-way clutches of the type having a composite outer member, i.e., one made up of a plurality of pieces from different materials, it has been the practice to provide the wedging surfaces by means of individual projections formed from the wedging element of the outer member. As a result, the individual wedging surfaces are subjected to bending loads and this further reduces the amount of power which can be transmitted.

It is, therefore, a still further object of this invention to provide an improved high strength, composite one-way clutch.

SUMMARY OF THE INVENTION

All of the features of the invention are employed in a one-way clutch that is comprised of an inner member having an outer surface, an outer member rotatable relative to the inner member and defining caging recesses formed in part by wedging surfaces that face the inner member outer surface. A plurality of wedging members are each supported within a respective one of the recesses and between the inner member outer surface and the outer member wedging surfaces for establishing a coupling between the inner and outer members for simultaneous rotation.

In accordance with one feature of the invention, the outer member is formed by a first portion that defines the recesses but not the wedging surfaces and a second portion fixed relative to the first portion and defining the wedging surfaces. The first portion is formed from a lighter weight material having less tensile strength than the second portion. The second portion has a planar part from which projections forming the wedging surfaces extend. A more rigid member is affixed to and reinforces the planar part.

In accordance with another feature of the invention, the outer member is also formed by a first portion that defines the recesses but not the wedging surfaces and a second portion that is fixed relative to the first portion and which defines the wedging surfaces. The first portion is formed from a lighter weight material and has less tensile strength than the second portion. In accordance with this feature, one of the portions is formed from a plurality of discrete parts that are fixed to the other portion.

In accordance with yet another feature of the invention, the outer member is also formed by a first portion that defines the recesses but not the wedging surfaces and a second portion that is fixed relative to the first portion and which defines the wedging surfaces. The first portion is formed from a lighter weight material having less tensile strength than the second portion. In accordance with this feature of the invention, pairs of axially spaced wedging members are received within the recesses and are engaged with the same wedging surface of the second portion.

In accordance with still another feature of the invention, the outer member is also formed by a first portion that defines the recesses but not the wedging surfaces and a second portion that is fixed relative to the first portion and which defines the wedging surfaces. The first portion is formed from a lighter weight material having less tensile strength than the second portion. In accordance with this feature of the invention, the second portion has a planar part that extends generally perpendicularly to the axis of rotation and an inturned continuous flange forming the wedging surfaces.

BRIEF DESCRIPTION OF THE DRAWINGS

FIG. 9 is a side elevational view, with a portion broken away, of a one-way clutch constructed in accordance with a further embodiment of the invention.

FIG. 10 is a cross-sectional view taken along the line 10—10 of FIG. 9.

FIG. 19 is a cross-sectional view of a one-way clutch constructed in accordance with yet another embodiment of the invention and is taken along the line 19—19 of FIG. 20.

FIG. 20 is a cross-sectional view taken along the line 20—20 of FIG. 19.

FIG. 21 is a cross-sectional view taken along the line 21—21 of FIG. 19.

FIG. 22 is a side elevational view, with a portion broken away, of a one-way clutch constructed in accordance with yet a further embodiment of the invention.

FIG. 23 is a cross-sectional view taken along the line 23—23 of FIG. 22.

FIG. 24 is a cross-sectional view taken along the line 24—24 of FIG. 22.

FIG. 25 is a cross-sectional view taken along the line 25—25 of FIG. 22.

FIG. 26 is a cross-sectional view taken along the line 26—26 of FIG. 25.

FIG. 27 is a side elevational view of a one-way clutch constructed in accordance with yet another embodiment of the invention.

FIG. 28 is a cross-sectional view taken along the line 28—28 of FIG. 27.

FIG. 29 is a cross-sectional view taken along the line 29—29 of FIG. 28.

FIG. 30 is a partial cross-sectional view, in part similar to FIG. 28, showing another embodiment of the invention.

DETAILED DESCRIPTION OF THE PREFERRED EMBODIMENTS

Figure 1:
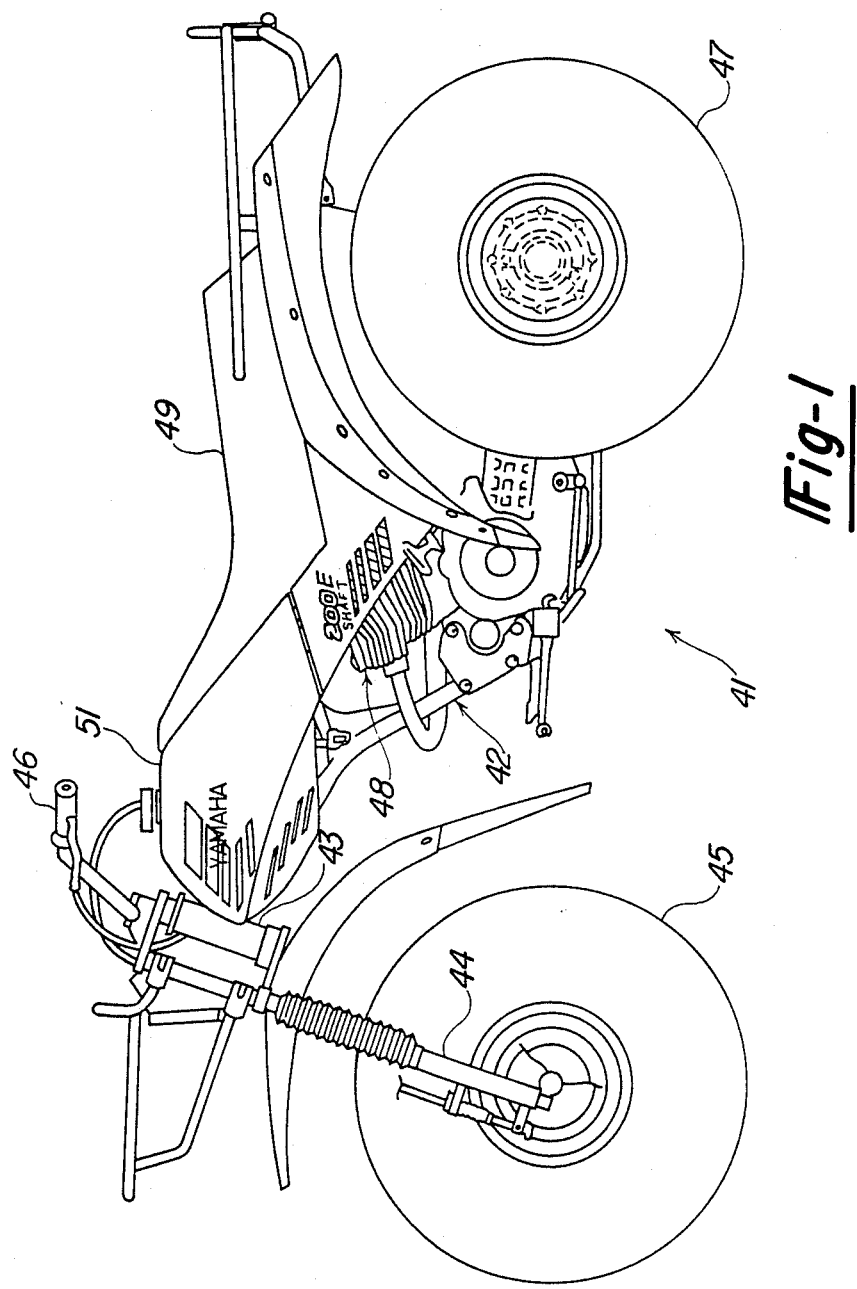
FIG. 1 is a side elevational view of an off the road vehicle having a power unit providing a typical environment for a one-way clutch constructed in accordance with embodiments of the invention.
Figure 2:
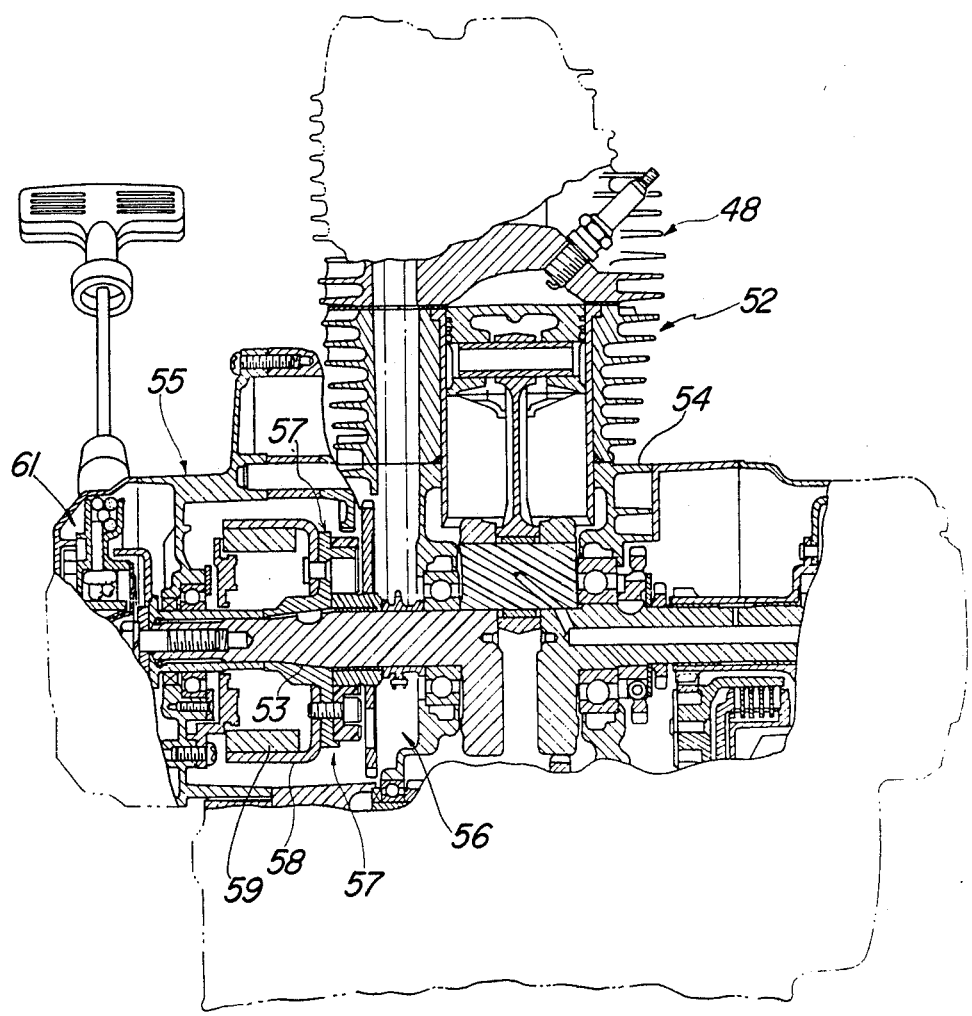
FIG. 2 is an enlarged cross-sectional view of the power unit and showing a one-way clutch constructed in accordance with a first embodiment of the invention.

Referring first to FIGS. 1 and 2 and initially to FIG. 1, a typical environment is illustrated in which a one-way clutch constructed in accordance with any one of the embodiments of the invention can be employed. An off the road vehicle, which is such an environment, is identified generally by the reference numeral 41. The vehicle 41 includes a frame assembly, indicated generally by the reference numeral 42 that includes a head pipe 43 which journals a front fork 44. A front wheel carrying a balloon tire 45 is carried by the front fork 44 and may be steered by means of a handlebar assembly 46 in a known manner.

A pair of rear wheels carrying balloon tires 47 are supported at the rear end of the frame 42 and are powered by a power unit, indicated generally by the reference numeral 48. The power unit 48 will be described in more detail to reference to FIG. 2.

A seat 49 is carried by the frame 42 rearwardly of a fuel tank 51 which is, in turn, supported by the frame adjacent the head pipe 43. The vehicle 42 is of the type that is designed primarily to be ridden by a single rider.

Referring now to FIG. 2, the power unit 48 is comprised of an internal combustion engine, indicated generally by the reference numeral 52. The engine 52 drives an output shaft 53 which is, in the illustrated embodiment, a crankshaft. The crankshaft 53 is rotatably journaled within a combined crankcase transmission casing 54 and drives a change speed transmission through a centrifugal clutch and a manually operated multiple disk clutch. Since the transmission assembly forms no part of the invention, it has not been illustrated nor will it be described in detail.

A combined starter generator housing, indicated generally by the reference numeral 55, is affixed to one side of the engine 52. The housing 55 includes, among other things, an electric starter mechanism, indicated generally by the reference numeral 56 and which includes a one-way clutch 57 constructed in accordance with an embodiment of the invention. In addition, there is provided a magneto generator including an outer, generally cup-shaped member 58 that carries a plurality of permanent magnets 59 that cooperate with a stationary winding (not shown) for generating power and for providing electricity for firing the ignition system of the engine 52.

A pull type starter mechanism, indicated generally by the reference numeral 61, is mounted at the outer end of the housing 55 for emergency pull starting of the engine 52.

Figure 3:
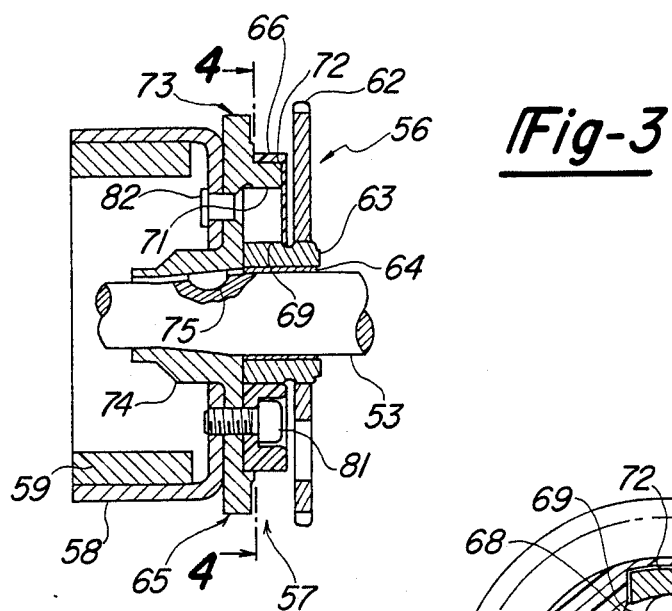
FIG. 3 is an enlarged cross-sectional view showing a one-way clutch constructed in accordance with a first embodiment of the invention.
Figure 4:
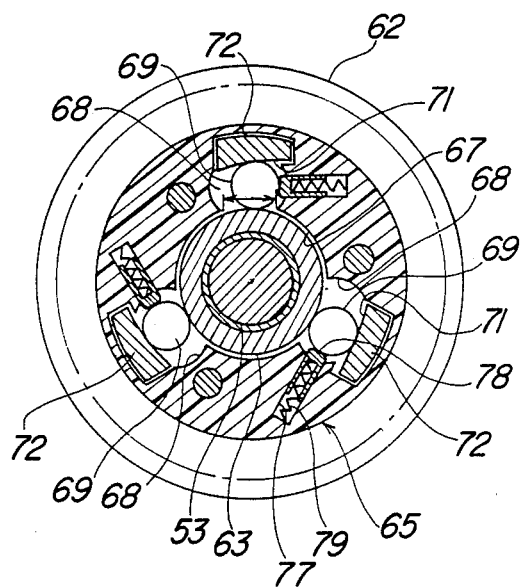
FIG. 4 is a cross-sectional view taken along the line 4—4 of FIG. 3.
Figure 5:
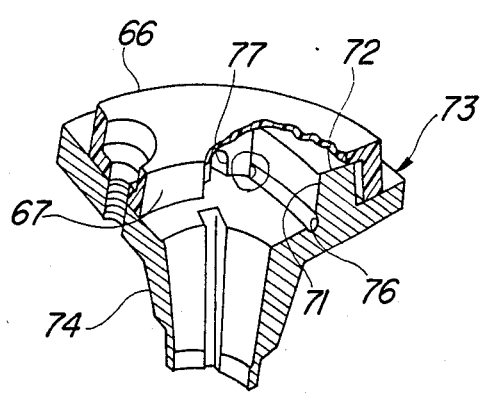
FIG. 5 is a perspective view, with portions broken away and other portions shown in section, of the one-way clutch.

Referring now primarily to FIGS. 3 through 5, the starter mechanism 56 includes a gear 62 that is driven by a driving gear (not shown) of an electric starter motor. The gear 62 is affixed for rotation with an inner member 63 of the one-way clutch 57 in a suitable manner. The inner member 63 is rotatably journaled on the crankshaft 53 by means of a plain bearing 64. The inner member 63 has a cylindrical outer surface.

The one-way clutch 57 further includes an outer member, indicated generally by the reference numeral 65, which is of a composite construction and consists of a first, caging element 66 that is formed from a light weight material having relatively low tensile strength such as a molded plastic or sintered metal. The caging element 66 has a partially cylindrical inner surface 67 that is spaced radially outwardly from the cylindrical outer surface of the inner member 63. The caging element 66 is formed with a plurality of recesses 68.

Wedging members 69 are received within the recesses 68. The wedging members 69 are contained between the outer surface of the inner members 63 and wedging surfaces 71 formed by projecting 72 of a wedging element, indicated generally by the reference numeral 73. The wedging element 73 is formed from a high strength, higher weight material than the caging element 66. However, since the wedging element 73 need not form the recesses 68, the clutch assembly and specifically the outer member 65 can be of a lighter weight than were a single piece construction employed.

The projections 72 extend from a generally cylindrical part of the wedging element 73 and this cylindrical part is formed with a hub portion 74. This hub portion 74 is affixed for rotation with the crankshaft 53 by means of a key 75.

It should be noted that the area where the projections 72 meet the cylindrical portion of the wedging element 73, they are formed with a fillet 76 so as to provide clearance for the mating corner of the wedging member 69.

The caging element 66 is provided with a plurality of generally cylindrical recesses 77 that intersect the recesses 69. Plungers 78 are received and slidably supported in the recesses 77 and are urged into engagement with the wedging members 69 by coil compression springs 79. As a result, the wedging members 69 will be urged into engagement with the wedging surfaces 71 and, accordingly, into the outer surface of the inner member 63.

The wedging element 73 and caging element 66 are secured together by means of a plurality of threaded fasteners 81. In addition, the outer member 65 comprised of these two elements is affixed to the cup-shaped member 58 of the magneto generator by the screws 81.

A plurality of rivets 82 are employed for staking the wedging element 75 to the cup-shaped member 58 so as to reinforce it and thus permits the clutch per se to be lighter in weight.

In this embodiment, when the starter gear 62 is rotated in a counterclockwise direction as seen in FIG. 4, the wedging members 69 will be cammed into engagement with the wedging surfaces 71 by the rotation of the inner members 63 and the action of the plungers 78 so as to rotatably drive the outer member 65 and, accordingly, the crankshaft 53. Once the crankshaft 53 is driven by the engine's running, however, the rotation of the gear 62 may be stopped and the outer member 65 will overrun the inner member 63, as is believed to be well known to those versed in this art.

Figure 6:
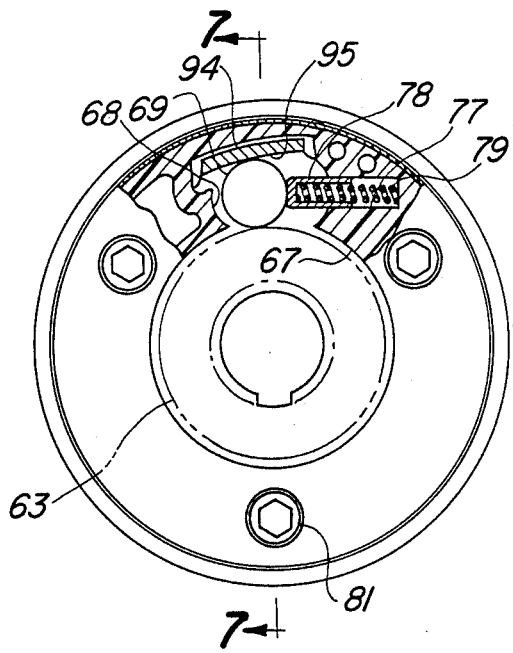
FIG. 6 is a side elevational view of a one-way clutch constructed in accordance with another embodiment of the invention, with a portion broken away.
Figure 7:
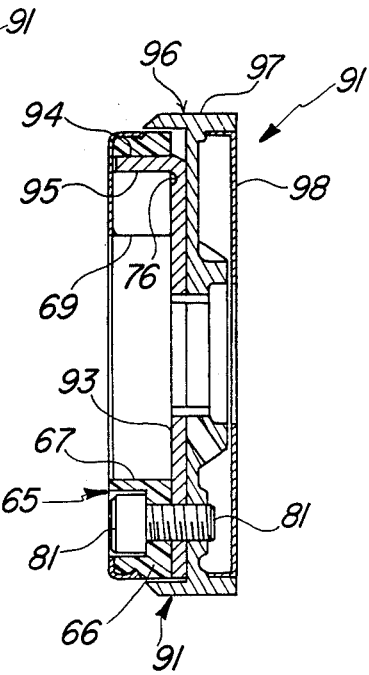
FIG. 7 is a cross-sectional view taken along the line 7—7 of FIG. 6.
Figure 8:
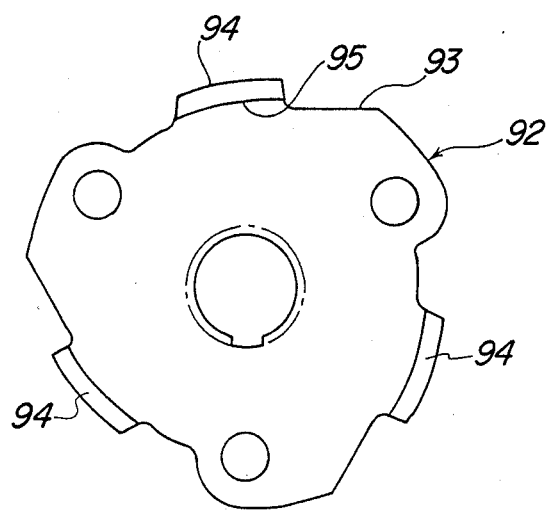
FIG. 8 is a perspective view showing the wedging element of the outer member of this embodiment.

A one-way clutch constructed in accordance with a second embodiment of the invention is shown in FIGS. 6 through 8 and is identified generally by the reference numeral 91. The one-way clutch 91 is similar in many regards to the embodiment of FIGS. 3 through 5. The main differences between this embodiment and the preceding embodiment relate to the construction of the wedging element and its association with a reinforcing member. For this reason, components which are the same or substantially the same as the preceding embodiment have been identified by the same reference numerals and will be described again only insofar as is necessary to understand the construction and operation of this embodiment.

In this embodiment, a wedging element 92 of the outer member is formed from a plate-like material having a planar section 93 and may be formed from any suitable high tensile material such as sheet steel. Extending axially from the planar section 93 are a plurality of projections having inner surfaces 95 that form a wedging surfaces which cooperate with the wedging members 69 in the manner of the previously described embodiment. The area where the projections 94 join the section 93 is provided with fillets 76 as in the previous embodiment so as to clear the wedging member 69.

In this embodiment, the wedging element 92 is reinforced by means of an oil filter assembly, indicated generally by the reference numeral 96. The oil filter assembly 96 includes a base housing 87 that is affixed to the wedging element portion 93 and caging element 66 by means of the threaded fasteners 81. A cover plate 98 is affixed to the base 97 and the oil filter 96 receives oil through a passage (not shown) formed in the shaft which it surrounds. The oil and contaminants are then separated by the centrifugal force of rotation with the foreign particles being thrown to the outer surface of the base 97 and retained there while the cleaned oil may flow out through a suitable discharge passage (not shown).

A one-way clutch constructed in accordance with still another embodiment of the invention is illustrated in FIGS. 9 and 10 and is identified generally by the reference numeral 101. The one-way clutch 101 is similar to the one-way clutch of the embodiment of FIGS. 3 through 5, however, in this embodiment, there is not reinforcing for the wedging element. However, in this embodiment, the caging element is formed with a plurality of outwardly extending fins 102 that will act as fan blades so as to direct a path of cooling air to some element of the engine to be cooled, for example, the magneto generator. In all other regards, this embodiment is the same as the previously described embodiments and, therefore, the components which are the same as those previously described or substantially the same have been indicated by the same reference numerals and will not be described again in detail.

Figure 11:
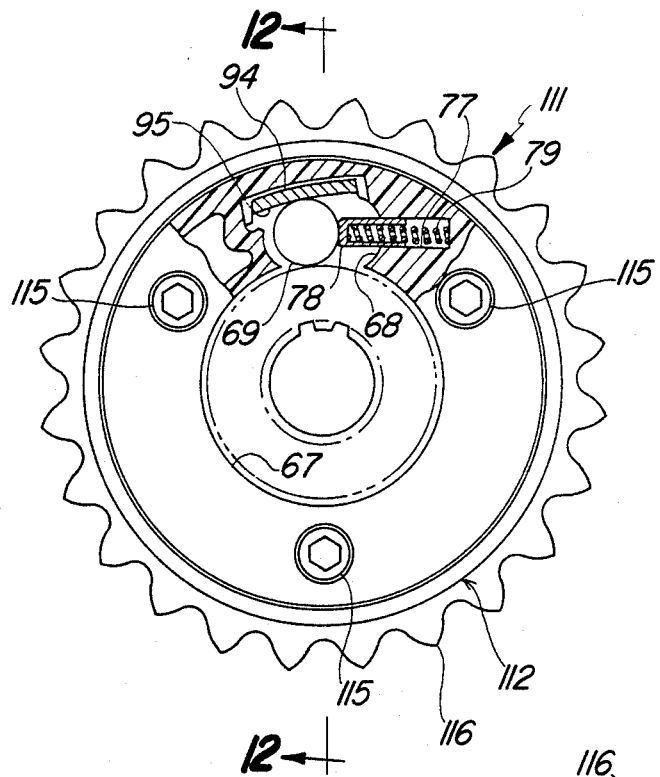
FIG. 11 is a side elevational view, with a portion broken away, of a one-way clutch constructed in accordance with a still further embodiment of the invention.
Figure 12:
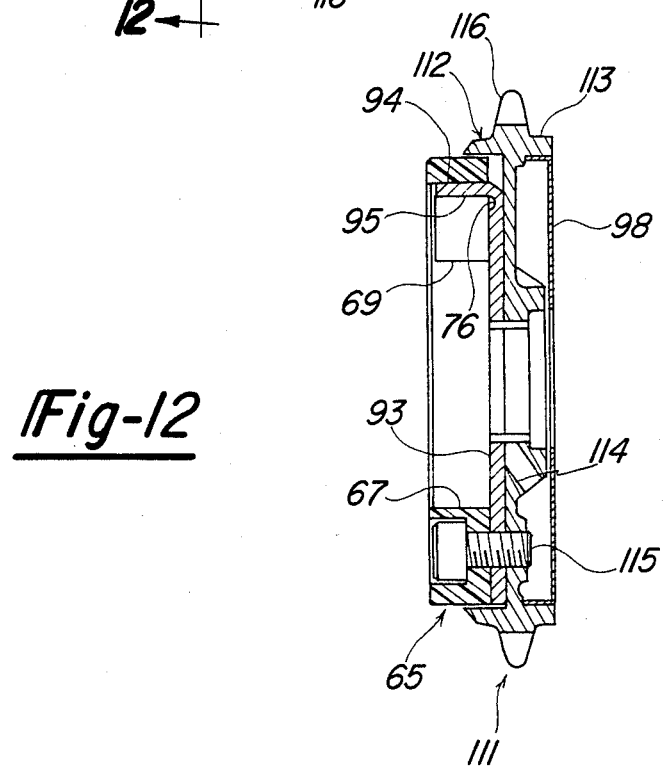
FIG. 12 is a cross-sectional view taken along the line 12—12 of FIG. 11.

A one-way clutch constructed in accordance with a further embodiment of the invention is shown in FIGS. 11 and 12 and is identified generally by the reference numeral 111. The one-way clutch 11 is substantially the same in construction as the embodiment of FIGS. 6 through 8. This embodiment differs from the previously described embodiment only in the element which is used for reinforcing the wedging element 92 and, for that reason, components which are the same as those of the embodiment of FIGS. 6 through 8 have been identified by the same reference numerals and will not be described again in detail.

In this embodiment, a sprocket, indicated generally by the reference number 112, which is used for driving the timing chain of the camshaft of the engine, is used for the reinforcing member. The sprocket 112 is formed with a flange portion 113 that radiates from a planer portion 114 which is, in turn, affixed to the wedging element 93 by threaded fasteners 115 so as to provide reinforcing. Teeth 116 extend from the flange portion 113 so as to drive the timing chain (not shown) in a known manner. The arrangement may also cooperate to act as an oil filter as with the embodiments of FIGS. 6 through 8 and for this purpose a cover plate 98 is affixed to the sprocket hub 113. This embodiment otherwise operates as the previously described embodiments and, for that reason, a detailed description of its operation is not believed to be necessary.

Figure 13:
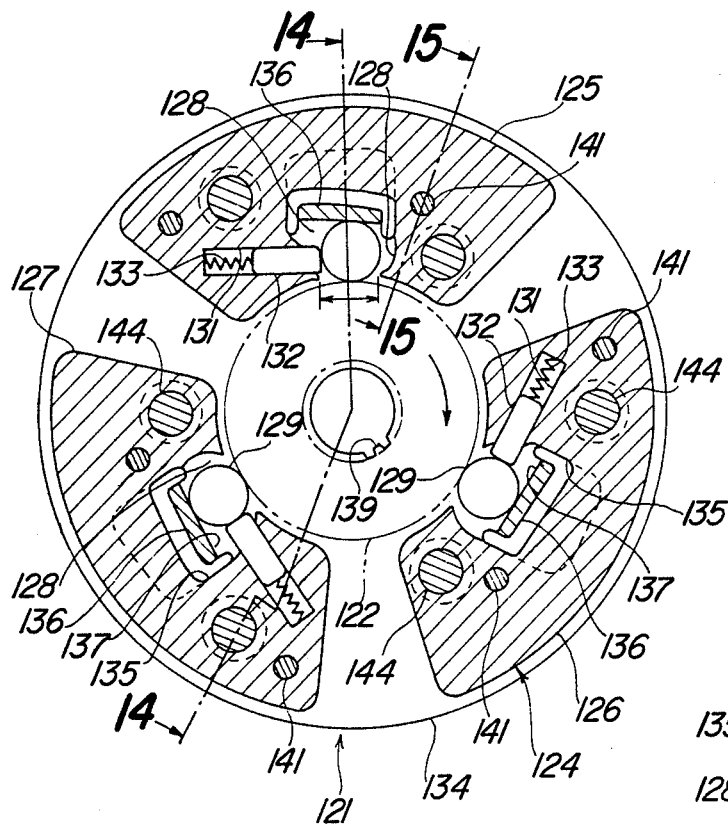
FIG. 13 is a cross-sectional view of a one-way clutch constructed in accordance with yet another embodiment of the invention and is taken along the line 13—13 of FIG. 14.
Figure 14:
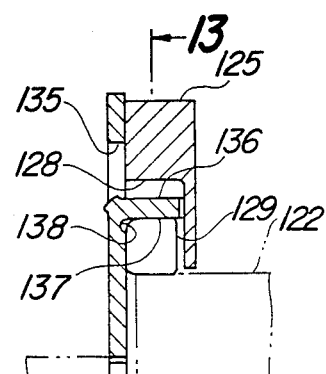
FIG. 14 is a cross-sectional view taken along the line 14—14 of FIG. 13.
Figure 15:
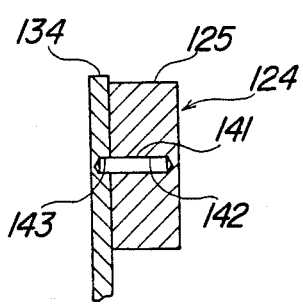
FIG. 15 is a cross-sectional view taken along the line 15—15 of FIG. 13.

In the embodiments of the invention thus far described, the outer member of the one-way clutch has consisted of two pieces, the caging element and the wedging element, each of which performs a separate caging and wedging function thus permitting a lighter weight than the prior art type of construction. When both of these elements are formed as single pieces, the single piece may have a complicated configuration and further cost advantages may be realized by making at least one or both of these elements from multiple pieces. A one-way clutch constructed in accordance with such an arrangement is illustrated in FIGS. 13 through 15 and is identified generally by the reference numeral 121. The one-way clutch 121 is comprised of an inner member 122 that has a cylindrical outer surface and which forms the driving or input element to the one-way clutch as in certain of the previously described embodiments for selectively driving a shaft 123.

An outer member, indicated generally by the reference numeral 124, is, like the previously described embodiments, made up of a wedging element and a caging element. In this embodiment, however, the caging element is comprised of a three piece construction having the pieces 125, 126 and 127. The pieces 125, 126 and 127 are formed from a light weigh, low tensile strength material such as a molded plastic or a sintered metal. In addition, each of the pieces 125, 126 and 127 has an identical configuration so that they may all be formed in the same mold or die.

Each piece 125, 126 and 127 is formed with a respective caging recess 128 in which a respective wedging member 129 is positioned. A bore 131 intersects each of the recesses 128 and slidably supports a plunger 132. The plungers 132 are urged into engagement with the respective wedging members 129 by means of coil compression springs 133 positioned in the bases of the recesses 131 and which act against the plungers 132.

A wedging element 134, which may be formed from a suitable high tensile strength material such as sheet steel is provided with a planar section that is formed with cutouts or recesses 135 from which inwardly extending projections 136 are bent. Projections 136 extend in a generally axial direction and form wedging surfaces 137 against which the wedging elements 129 are urged by the spring biased plungers 132.

The intersection between the surfaces 137 and the planar portion of the wedging element 134 are formed with fillets 138 so as to clear the wedging members 129.

The wedging element 134 is also provided with an internally splined opening 139 so as to provide the non-rotatable connection with the shaft 123.

The individual caging element pieces 125, 126 and 127 are non-rotatably aligned with the wedging element 134 by means of locating pins 141 that are received in bores 142 formed in the caging element pieces 125, 126 and corresponding bores 143 formed in the wedging element 134. In addition, threaded fasteners 144 serve to axially fix the pieces together.

It is believed that the operation of this embodiment should be clear to those skilled in the art, particularly in view of the previous description.

Figures 16, 17, 18:
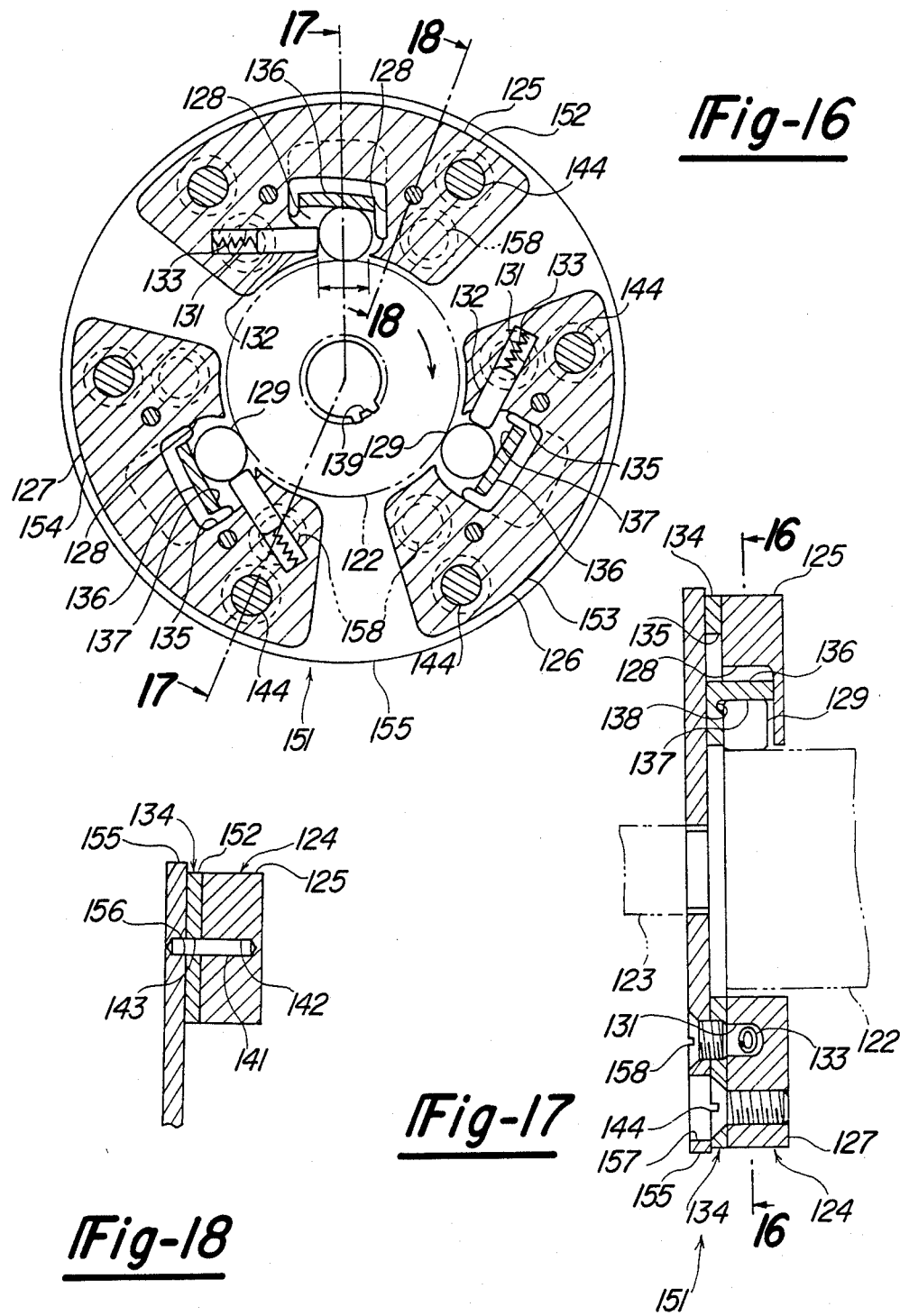
FIG. 16 is a cross-sectional view of a one-way clutch constructed in accordance with yet another embodiment of the invention and is taken along the line 16—16 of FIG. 17.
FIG. 17 is a cross-sectional view taken along the line 17—17 of FIG. 16.
FIG. 18 is a cross-sectional view taken along the line 18—18 of FIG. 16.

A one-way clutch constructed in accordance with a still further embodiment of the invention is illustrated in FIGS. 16 through 18 and identified generally by the reference numeral 151. The one-way clutch 151 is substantially the same as the one-way clutch 121 of the embodiment of FIGS. 13 through 15 and, for that reason, components which are the same have been identified by the same reference numerals and will not be described again. The main difference between the embodiment of FIGS. 16 through 18 and that of the embodiment of FIGS. 13 through 15 is in the construction of the wedging element 134 and its manner of attachment to the caging element pieces 125, 126 and 127.

In this embodiment, in addition to the caging element 124 being formed from three pieces 125, 126 and 127, the wedging element 134 is also formed from three pieces 152, 153 and 154. Like the pieces 125, 126 and 127, the pieces 152, 153 and 154 are all of the same construction. The screws 144 serve to hold the respective pieces 125, 152; 126, 153, and 127, 154 together. In addition, all of these pieces are secured together in fixed circumferential relationship by means of a backing plate 155 which has a generally annular configuration and in which the splines 139 are formed. It should be noted that the pins 141 extend through bores 144 formed in the wedging member pieces 152, 153 and 154 and are received in blind bores 156 formed in the backing plate 155 so as to provide circumferential alignment.

The backing piece 155 is formed with bores 157 so as to permit access to the heads of the screws 144 for their tightening. In addition, threaded fasteners 158 secure the backing plate 155 to the wedging element pieces 152, 153 and 154 so as to form a subassembly of them. In other regards, this embodiment is the same as those previously described and it is believed that its operation will be readily apparent to those skilled in the art.

Referring now to FIGS. 19 through 21, a one-way clutch constructed in accordance with a still further embodiment of this invention is identified generally by the reference numeral 171. As with the preceding embodiments, the one-way clutch 171 is designed so as to permit a driving connection between an inner member 172 and a shaft 173 while permitting overrunning of the shaft 173 relative to the inner member 172.

The one-way clutch 171 includes an outer member, indicated generally by the reference numeral 174 which is made up of caging element pieces 175, 176, and 177. The caging element pieces 175, 176 and 177 are formed from a light weight, low tensile strength material such as a molded plastic or a sintered metal and define respective caging recesses 178. It will be noted that the element pieces 175, 176 and 177 all have identical configurations and, therefore, may be formed as identical pieces so as to reduce the number of molds or dies which are required to form them.

Caging members 179 are received within the recesses 178 and are engaged with a cylindrical outer surface of the inner member 172. Wedging elements, indicated generally by the reference numeral 181, are affixed, in a manner to be described, relative to the pieces of the caging element 174 and have inwardly extending projections 182 that define wedging surfaces 183 that are engaged with the outer surfaces of the wedging members 179. The wedging element pieces 181 are formed from a higher tensile strength material than the caging member pieces 175, 176 and 177, such as sheet steel.

Plungers 184 are received in recesses 185 of the caging member pieces 175, 176 and 177 which intersect the recesses 178. Coil compression springs 186 supported at the base of the recesses 185 urge the plungers 184 into engagement with the wedging members 179 so as to hold the wedging members in engagement with the wedging surfaces 183 and the outer surface of the inner member 172.

The outer member 174 is completed by an annular backing plate 187 to which the wedging pieces 181 and caging pieces 175, 176 and 177 are affixed. The caging pieces 175, 176 and 177 are circumferentiallylocated by means of locating pins 188 that extend through bores 189 formed in the caging pieces 175, 176 and 177 and bores 191 formed in the backing piece 187. Screws 192 hold the caging pieces 175, 176 and 177 axially relative to the backing piece 187.

In a similar manner, the wedging pieces 181 are affixed to the backing plate 187 by means of locating pins 193 that are received within respective bores and are held axially in place by screws 194.

The backing plate 187 has an internally splined opening 195 that provides the non-rotatable connection to the shaft 173.

From the foregoing description and from that of the plurality described embodiments, it is believed that the operation of this embodiment should be well understood by those skilled in this art.

A one-way clutch constructed in accordance with yet another embodiment of this invention is identified generally by the reference numeral 201 and is shown in FIGS. 22 through 26. As with the previously described embodiments, the one-way clutch 201 is designed so as to provide a driving relationship between an inner member 202 and a shaft 203. The inner member 202 has, as in the previously described embodiment, a generally cylindrical outer surface.

In addition to the inner member 202, the one-way clutch 201 includes an outer member, indicated generally by the reference numeral 204. The outer member 204 is comprised of a caging element 205 which may have a construction of the type as described in connection with any of the previously mentioned embodiments. That is, the caging element 205 is formed from a light weight, low tensile strength material and may be of one or several pieces. In accordance with this embodiment, however, the caging element 205 is provided with a first series of caging recesses 206 that face in one axial direction. In addition, there is provided a second series of caging recesses 207 which face in the opposite axial direction. It should be noted that the caging recesses 206 and 207 extend through the outer face of the respective surface of the caging element 205. It should also be noted from the figures that the caging recesses 206 and 207 are offset slightly from each other in a circumferential direction. That is, there are adjacent but circumferentially offset pairs of caging recesses 206 and 207, for a reason to become apparent.

Wedging members 208 are received within the caging recesses 206 and wedging members 209 are received within the caging recesses 207. The wedging members 208 and 209 of each pair are engaged with the outer surface of the inner member 202.

The outer member 205 further includes a wedging element 211 which is formed, as in the preceding embodiments, from a higher tensile strength material than the caging member 204 from one or several pieces. The wedging element 211 has a generally planar surface from which axially extending projections 212 extend. Each projection 212 extends into and registers with reach recess 206 and 207 of a respective pair thereof. The projections 211 have inner wedging surfaces 213 with which the wedging members 208 and 209 coact, as in the preceding embodiment. There are formed fillets 214 at the intersection of the projections 212 with the main body portion of the wedging element 211 so as to afford clearance for the wedging members 208.

There are provided a first series of recesses 215 that cooperate with the caging recesses 206 and which open through the same side of the wedging element 204 and a second series of recesses 216 that cooperate with the recesses 207 and which open through the opposite side of the caging element 204. Plungers 217 are received within each of the recesses 215 and 216 and are urged by coil compression springs 218 into engagement with the respective wedging members 208 or 209.

The wedging element 211 is affixed to the caging element 205 by means of a plurality of threaded fasteners 219. In addition, the wedging element 211 serves to close the recesses 206 and the recesses 215 so as to hold the components in assembled relationship. However, it should be noted that the wedging members 208 may be inserted axially into the recesses 206 and hence an easier assembly is provided. In a similar manner, a closure plate 221 is affixed to the oppsoite face of the caging element 205 by means of screws 222 so as to close the recesses 207 and 216 and hold the elements in position.

The wedging element 211 is formed with an internally splined opening 223 that cooperates with the shaft 203 so as to form the driving connection therebetween.

It should be readily apparent that this embodiment works in a similar manner to the previously described embodiments. However, it should be noted that the fact that there are pair of cooperating wedging members will increase the amount of power that can be transmitted through the clutch 201 while, at the same time, maintaining a compact overall construction. It should also be understood that the wedging element and/or caging elements of this embodiment may be formed from multiple pieces as in certain of the previously described embodiments.

A one-way clutch constructed in accordance with yet another embodiment of the invention is illustrated in FIGS. 27 through 29 and is identified generally by the reference numeral 241. As with each of the preceding embodiments, the one-way clutch 241 is designed so as to transmit rotation between an inner member 242 having a cylindrical outer surface and a shaft 243 which has a splined connection to a component of an outer member, indicated generally by the reference numeral 244.

As with each of the preceding embodiments, the outer member 244 includes a caging element 245 which is formed from a light weight, relatively low tensile strength material such as a molded plastic or a sintered metal. The caging element 245 is formed with respective caging recesses 246. Wedging members 247 are received within the recesses 246 and cooperate with the cylindrical outer surface of the inner member 242. It should be noted that the configuration of the recesses 246 is such that there radially inner opening has a dimension L which s less than the diameter (2B) of the wedging members 247. However, the recesses 246 open through an axial face of the caging element 245 so that the wedging members 247 may be inserted into the recesses 246 in an axial direction.

The outer face of the recesses 246 is closed by a planar section of a wedging element 248. The wedging element 248 has an inturned flange 249, portions of which extend across the recesses 246 to form wedging surfaces 251 that the wedging members 247 engage. Because the flange 249 is continuous rather than comprising individual projections as in the preceding embodiments, it will be more rigid and better suited to take the tensile forces so as to transmit higher loads than witht he preceding embodiment. As with the preceding embodiments, however, the wedging element 248 is formed from a high tensile material such as a steel stamping.

The area where the flange 249 meets the planar section is formed with a fillet 252 so as to afford clearance for the edges of the wedging members 247. The wedging element 248 is affixed to the caging element 245 by a plurality of circumferentially spaced machien screws 253. As such, the wedging element 248 will also hold the wding members 247 axially in position.

The caging element 245 is provided with recesses 254 in which plungers 255 are slidably supported. The plungers 255 are urged into engagement with the wedging members 247 by coil compression springs 256 so as to urge the wedging members 247 into engagement with the wedging surfaces 251 and other surfaces of the inner member 242.

The wedging element 248 is formed with an internally splined opening 257 for providing the rotating connection between the outer member 244 and the shaft 243. It is believed that the operation of this embodiment will be readily apparent from the foregoing descriptions of the other embodiments since the principle of operation is the same.

Yet another embodiment of the invention is identified generally by the reference numeral 271 and is shown in FIG. 30. This embodiment is substantially the same as the embodiment of FIGS. 27 through 29 and, for that reason, components which are the same have been identified by the same reference numerals and will not be described again in detail. In essence, the only difference between this embodiment and the embodiment of FIGS. 27 through 29 is that the wedging element 248 of the outer member 244 has its inturned flange 249 reinforced by a peripheral radially outwardly extending flange 272. This adds further to the rigidity of the construction and permits a lighter weight material to be used without sacrifice of strength.

Figure 31:
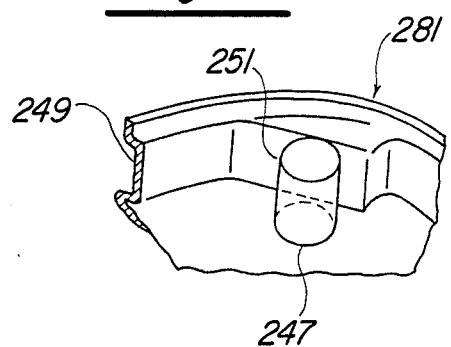
FIG. 31 is a partial perspective view showing a still further embodiment of the invention.
Figure 32:
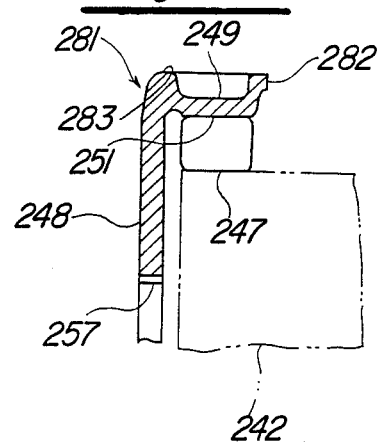
FIG. 32 is a cross-sectional view of the embodiment of FIG. 31.

Yet still another embodiment of the invention is illustrated in FIGS. 31 and 32 wherein a one-way clutch constructed in accordance with this embodiment is identified generally by the reference numeral 281. Like the embodiment of FIG. 30, this embodiment differs from the embodiment of FIGS. 27 through 29 only in the way that the flange 249 of the wedging element 248 is reinforced and, for that reason, only these components will be described in detail. The remaining elements, where they have been illustrated, are identified by the same reference numerals as utilized in FIGS. 27 through 28.

In this embodiment, the peripheral flange 249 of the wedging element 248 is reinforced by an inner flange 282 and an outer flange 283. Hence, further reinforcing is provided by both of these flanges and this further permits a lightening in the overall weight of the clutch.

It should be readily apparent from the foregoing description that a number of embodiments of one-way clutches have been illustrated and described, each of which permits a light weight construction and the transmissions of relatively high powers. In addition, the construction of the embodiments is such that they may be convenientlyformed and easily assembled. Although a number of embodiments of the invention have been illustrated and described, various changes and modifications may be made without departing from the spirit and scope of the invention, as defined by the appended claims.

We claim:

1. In a one-way clutch having an inner member having an outer surface, an outer member rotatable relative to said inner member and defining caging recesses formed in part by wedging surfaces facing said inner member outer surface, and a plurality of wedging members each supported within a respective one of said recesses and between said inner member outer surface and said outer member wedging surface for rotatably coupling said inner and outer members, the improvement comprising said outer member being formed by a first portion defining said recesses but not said wedging surfaces and a second portion fixed relative to said first portion and defining said wedging surfaces, said first portion being formed from a lighter weight material having less tensile strength than said second portion, said second portin having a planar part from which projections forming said wedging surfaces extend and cooperating with said wedging members to take substantially all the tensile forces therefrom, and a more rigid element affixed to and reinforcing said planar part.

2. In a one-way clutch as set forth in claim 1 wherein the more rigid element comprises a component of a magneto generator.

3. In a one-way clutch as set forth in claim 2 wherein the element of the magneto generator comprises a cup-shaped member carrying permanent magnets.

4. In a one-way clutch as set forth in claim 1 wherein the more rigid element comprises a transmission element.

5. In a one-way clutch as set forth in claim 4 wherein the transmission element comprises a gear.

6. In a one-way clutch as set forth in claim 5 wherein the gear is a gear driven by a starter motor.

7. In a one-way clutch as set forth in claim 4 wherein the transmission element comprises a sprocket.

8. In a one-way clutch as set forth in claim 7 wherein the sprocket drives a camshaft of an associated internal combustion engine.

9. In a one-way clutch as set forth in claim 1 wherein the more rigid element comprises a base of an oil filter.

10. In a one-way clutch as set forth in claim 9 wherein the oil filter is of the centrifugal rotating type and is driven by the base.

11. In a one-way clutch having an inner member having an outer surface, an outer member rotatable relative to said inner member and defining caging recesses formed in part by wedging surfaces facing said inner member outer surface, a nd a plurality of wedging members each supported within a respective one of said recesses and between said inner member outer surface and said outer member wedging surface for rotatably coupling said inner and outer members, the improvement comprising said outer member being formed by a first portion defining said recesses but not said wedging surfaces and a second portion fixed relative to said first portion and defining said wedging surfaces and an interconnecting part interconnecting said wedging surfaces cooperating with said wedging members to take substantially all the tensile forces therefrom, said first portion being formed from a lighter weight material having less tensile stength than said second portion, said first portion being formed from a plurality of discrete parts fixed to said second portion.

12. In a one-way clutch as set forth in claim 11 wherein the discrete parts each have the same configuration.

13. In a one-way clutch as set forth in claim 12 wherein the discrete parts each form a separate caging recess and a further recess intersecting the caging recess and containing biasing means for urging the respective wedging member into engagement with the respective wedging surfaces and inner member outer surface.

14. In a one-way clutch as set forth in claim 13 wherein the plurality of discrete parts are pinned to the second portion for circumferentially aligning the first and second portions.

15. In a one-way clutch as set forth in claim 11 further including reinforcing means affixed to the second portion for adding to its rigidity.

16. In a one-way clutch as set forth in claim 15 wherein the second portion is also formed from a plurality of discrete parts, said discrete parts of said second portion being affixed to said rigid member.

17. In a one-way clutch having an inner member having an outer surface, an outer member rotatable relative to said inner member and defining caging recesses formed in part by wedging surfaces facing said inner member outer surface, and a plurality of wedging members each supported within a respective one of said recesses and between said inner member outer surface and said outer member wedging surface for rotatably coupling said inner and outer members, the improvement comprising said outer member being formed by a first portion defining said recesses but not said wedging surfaces and a second portion fixed relative to said first portion and defining said wedging surfaces, said first portion being formed from a lighter weight material having less tensile strength than said second portion, said second portion being formed from a plurality of discrete parts affixed to a more rigid backing member and cooperating with said wedging members to take substantially all the tensile forces therefrom.

18. In a one-way clutch as set forth in claim 17 wherein said parts have an identical configuration.

19. In a one-way clutch having an inner member having an outer surface, an outer member rotatable relative to said inner member and defining caging recesses formed in part by wedging surfaces facing said inner member outer surface, and a plurality of wedging members each supported within a respective one of said recesses and between said inner member outer surface and said ouer member wedging surface for rotatably coupling said inner and outer members, the improvement comprising said outer member being formed by a first portion defining said recesses but not said wedging surfaces and a second portion fixed relative to said first portion and defining said wedging surfaces and an interconnecting part interconnecting said wedging surfaces cooperating with said wedging members to take substantially all the tensile forces therefrom, said first portion being formed from a lighter weight material having less tensile strength than said second portion, wherein the caging recesses comprise a first series of caging recesses formed on one side of the outer member first portion and a second series of caging recesses formed on the opposite side of the outer member first portion, said recesses being arranged inpairs with the recesses of each pair being slightly offset in a circumferential direction from each other.

20. In a one-way clutch as set forth in claim 19 wherein the same wedging surface engages the respective wedging members in the pairs of recesses.

21. In a one-way clutch as set forth in claim 20 wherein the recesses open through the respective outer faces of the first portion for axial insertion of the wedging members therein, said recesses being closed by respective cover plates affixed to said first portion.

22. In a one-way clutch having an inner member having an outer surface, an outer member rotatable relative to said inner member and defining caging recesses formed in part by wedging surfaces facing said inner member outer surface, and a plurality of wedging member each supported within a respective one of said recesses and between said inner member outer surface and said outer member wedging surface for rotatably coupling said inner and outer members, the improvement comprising said outer member being formed by a first portion defining said recesses but not said wedging surfaces and a second portion fixed relative to said first portion and defining said wedging surfaces, said first portion being formed from a lighter weight material having less tensile strength than said second portion, said second portion having a planar part extending generally perpendicular to the axis of rotation and an inturned continuous flange forming the wdging surfaces and cooperating with said wedging members to take substantially all the tensile forces therefrom.

23. In a one-way clutch as set forth in claim 22 wherein the inturned flange is non-cylindrical.

24. In a one-way clutch as set forth in claim 23 wherein the inturned flange is reinforced by at least one radially extending flange.

25. In a one-way clutch as set forth in claim 24 wherien the inturned flange is reinforced by a pair of radially extending flanges formed at the inner and outer extremities of the inturned flange.

* * * * *